Sept. 23, 1924.                                                1,509,291
                       R. H. GRIFFITH
                  SEED DISCHARGING MECHANISM
                    Filed Oct. 24, 1921            3 Sheets-Sheet 1
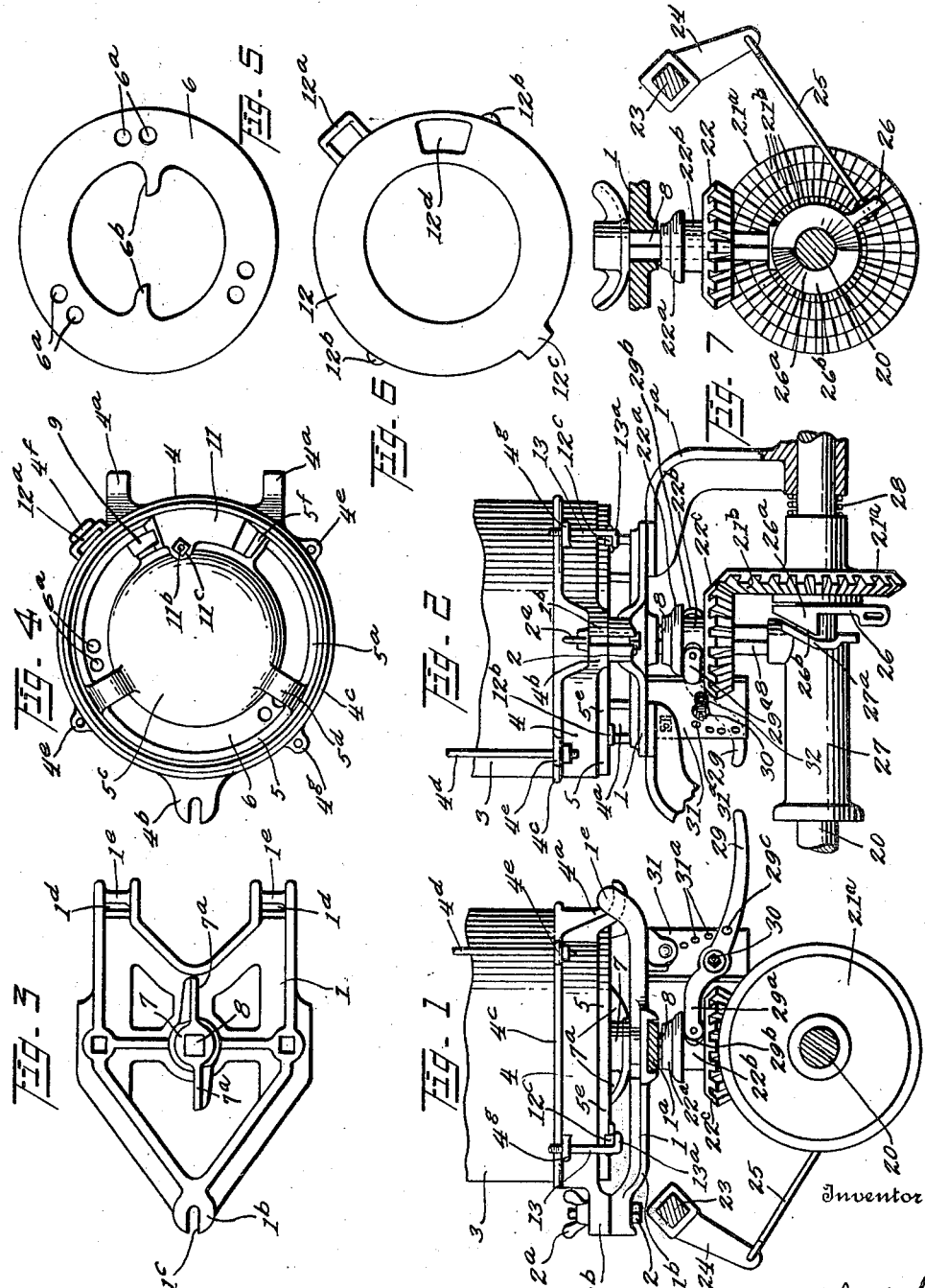

Sept. 23, 1924.
R. H. GRIFFITH
1,509,291
SEED DISCHARGING MECHANISM
Filed Oct. 24, 1921
3 Sheets-Sheet 2
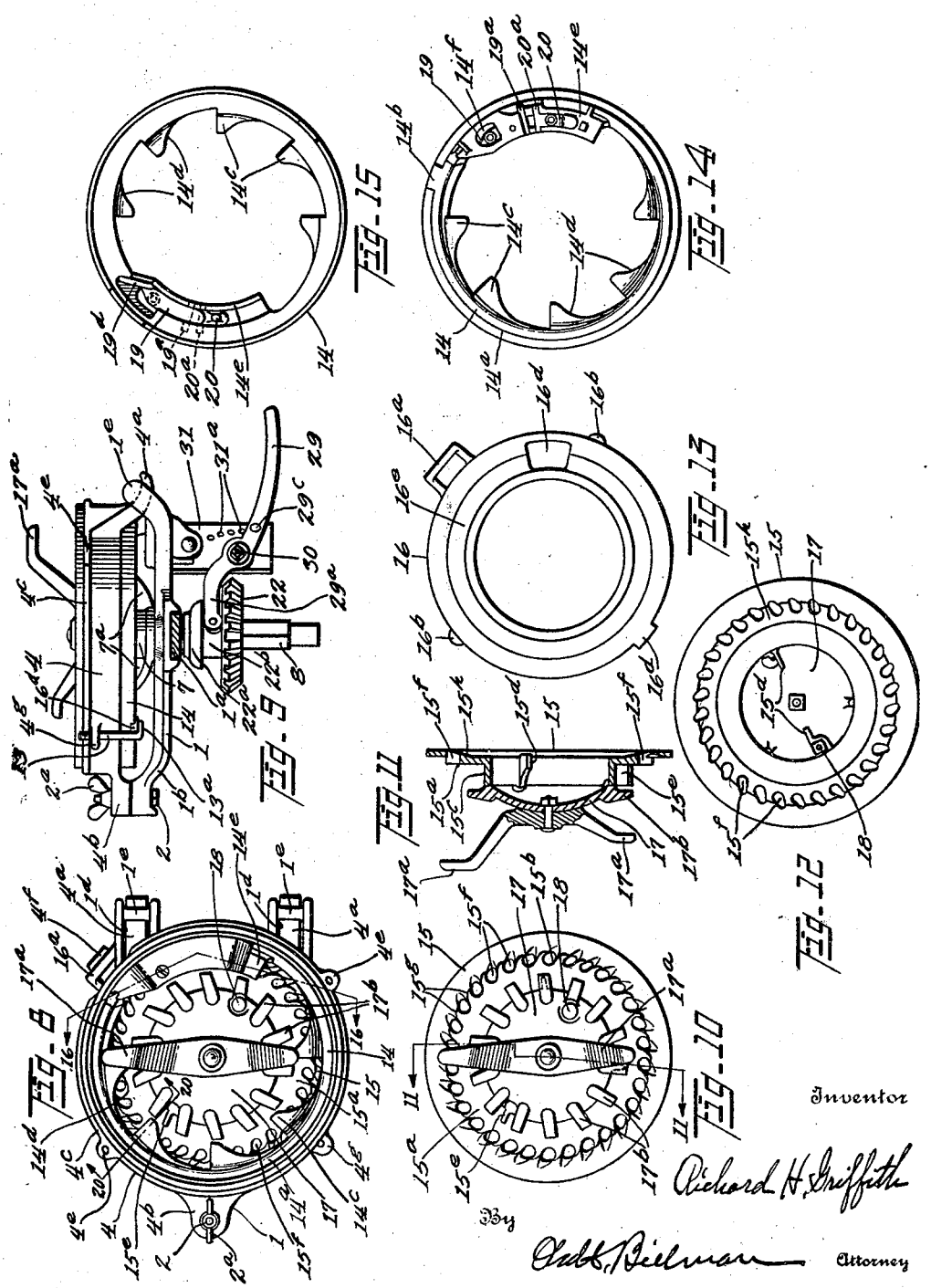

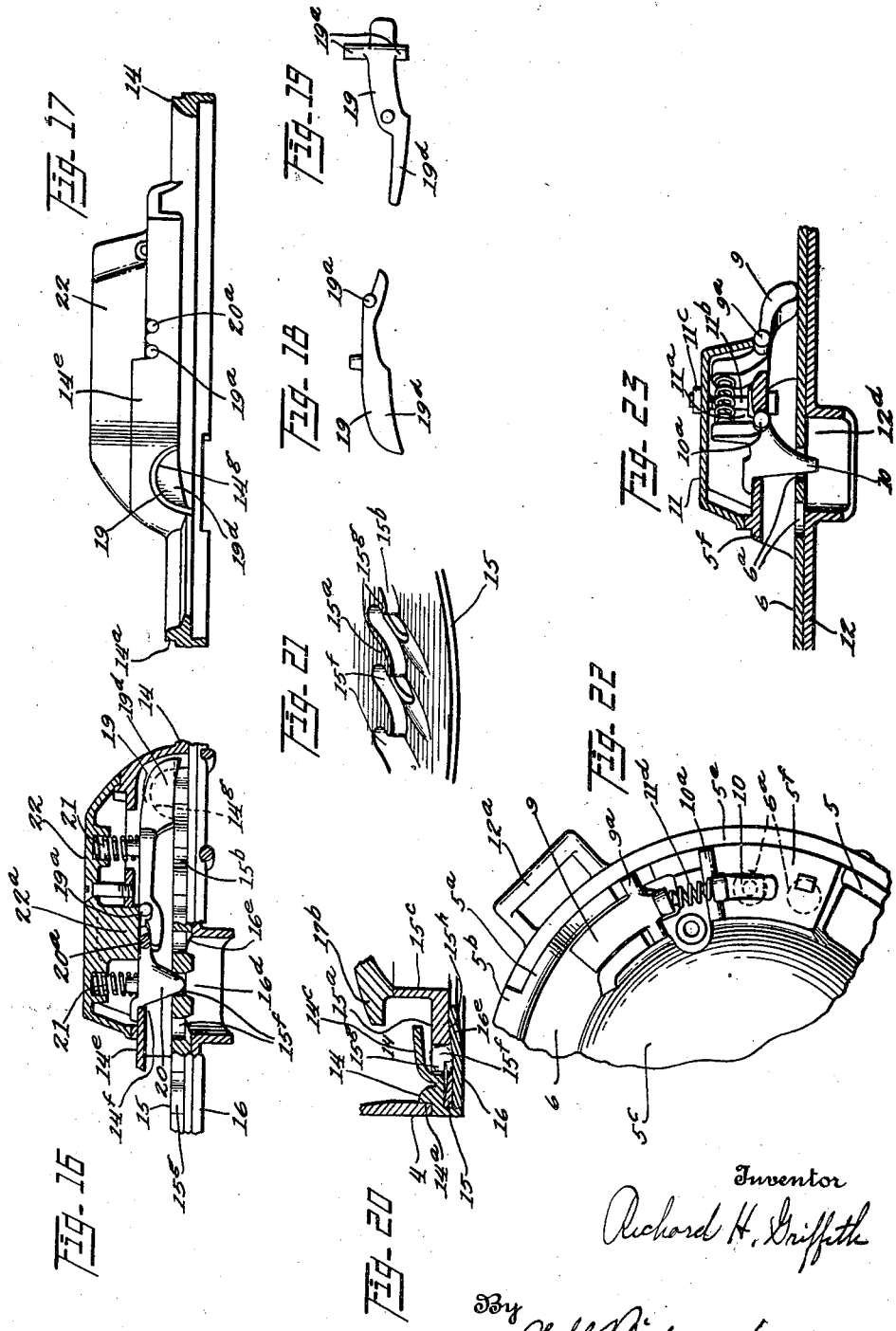

Patented Sept. 23, 1924.

1,509,291

UNITED STATES PATENT OFFICE.

RICHARD H. GRIFFITH, OF BELLEVUE, OHIO, ASSIGNOR TO THE OHIO CULTIVATOR COMPANY, OF BELLEVUE, OHIO, A CORPORATION OF OHIO.

SEED-DISCHARGING MECHANISM.

Application filed October 24, 1921. Serial No. 509,791.

*To all whom it may concern:*

Be it known that I, RICHARD H. GRIFFITH, a citizen of the United States, residing at Bellevue, in the county of Huron and State of Ohio, have invented certain new and useful Improvements in Seed-Discharging Mechanism, of which the following is a specification.

My invention relates to improvements in seed discharging mechanism, and more particularly to that class or type specially designed and adapted for use in connection with corn and cotton planters of the "Lister" type.

The primary object is to provide a removable hopper-carrying open base with a readily removable plate retaining device or ring together with suitable sets of feed and distributing plates, one set being specially designed for corn and the other for cotton seed and being adapted to be readily inserted in or removed from the hopper carrying open base when the latter is detached and the hopper reversed without removing the contents of the hopper.

The primary object of the invention is to provide generally improved corn and cotton seed discharging mechanism of the general character indicated, which will be simple in construction and efficient in use.

In mechanism of the character indicated, a hopper is mounted upon the carriage or frame of the soil penetrating and turning implement and is formed with an opening in its bottom, a rotating disc having pockets or cells of the required size, being mounted within the hopper and rotated by suitable driving mechanism to bring the cells successively into registry with an outlet opening through which the kernels which have been received into the cells are discharged one at a time. Where, as in the case of corn, the grain is clean and there is no tendency of the several seeds or kernels to adhere to each other, the problem of feeding them one at a time, in the manner described is a comparatively simple one. Feeding of cotton seed, however, is complicated and made much more difficult by reason of the lint adhering to the seeds which is ordinarily left by the gins to which the seed is subjected, and which causes the seed to mass and cling together.

A further object is to provide a new and improved form and arrangement of cooperating parts by which the cotton seed will be properly stirred up and agitated for separating the seeds and to this end a new and improved form of seed plate has been provided having seed cells so arranged and disposed tangentially and relatively to the adjacent distributor parts as to be adapted to assist in securing the entrance of a single seed in each cell.

A still further object is to provide a new and improved form of a cut-off plate having its operative edge extending diagonally across a row of cells of the feed plate and being adapted to force the seeds in the several cells toward the inner and deeper ends of such cells.

A still further object is the provision of improved driving mechanism for the seed discharging mechanism, improved gear shifting and gear mechanism being provided, whereby to vary the speed of the seed plate relatively to the driving mechanism which is operated from the driving axle of the ground wheels. As a result of this adjustment variation of the speed of the seed plate or dropping mechanism is attained without adjustment or variation of the speed of the driving mechanism, or gear wheel carried by the axle shaft.

With the above mentioned and other ends in view, the invention consists in the novel construction, arrangement, and combination of parts illustrated in one of its embodiments in the accompanying drawings, and particularly pointed out in the appended claims.

Referring to the drawings, forming a part of this specification, Figure 1, is a side elevation of seed discharging mechanism and gearings, constructed in accordance with this invention, and mounted for use on a planter of the lister type.

Fig. 2, a front elevation of the same.

Fig. 3, a top plan view of the hopper supporting saddle, detached.

Fig. 4, a top plan view of the hopper carrying base or ring, detached, the same being equipped with seed and distributer plates of the corn type, and the hopper being detached for the purpose of clearer illustration of the parts.

Fig. 5, a top plan view of the corn feed plate, detached.

Fig. 6, a top plan view of the bottom or feed and distributer plate retainer, detached.

Fig. 7, a side elevation of the variable feed or driving gearing and clutch and shift mechanism.

Fig. 8, a top plan view of the seed discharging mechanism equipped with feed distributer plates of the cotton seed type.

Fig. 9, a side elevation of the same.

Fig. 10, a top plan view of the cotton seed feed plate, detached.

Fig. 11, a sectional view of the same, taken on line 11—11 of Fig. 10.

Fig. 12, a plan view of the under side of same.

Fig. 13, a top plan view of the cotton seed plate retainer, detached.

Fig. 14, a top plan view of the cotton seed distributer plate, detached, the cut-off and knock-out cover or housing being detached to more clearly show the internal mechanism.

Fig. 15, a plan view of the under or bottom side of the cotton seed distributer plate and its cut-off and knocker mechanism.

Fig. 16, a sectional view taken on line 16—16 of Fig. 8, the cut-off and knocker cover or housing and the cotton seed feed and retainer plates being in their proper relative positions.

Fig. 17, an enlarged cross sectional view of the cotton seed distributer plate looking toward the cut-off and knock-out housing and cover plate.

Fig. 18, a side elevation of the cotton seed cut-off members, detached.

Fig. 19, a top plan view of the same.

Fig. 20, an enlarged cross sectional view taken on line 20—20 of Fig. 8.

Fig. 21, a fragmentary perspective view of the cotton seed feed plate and illustrating in particular the outwardly tapered seed cells separated by hook shaped projections.

Fig. 22, a fragmentary top plan view of the corn seed distributer plate, the housing for the cut-off and knock-out members being removed to more clearly illustrate the latter.

Fig. 23, an enlarged fragmentary view of the same with the housing in place.

Similar numerals of reference designate like parts thruout all the figures of the drawings.

The hopper supporting saddle 1, may be secured to the planter frame in any suitable and convenient manner, as for example,—by means of side supporting brackets 1$^a$, as shown most clearly in Fig. 2 of the drawings.

The saddle 1, in the present instance, is provided with a converging or pointed portion 1$^b$, having a bolt receiving slot 1$^c$, for receiving an attaching bolt 2, provided with a wing nut 2$^a$, for securing the front or free side of the hinged hopper carrying open base or frame hereinafter described. The rear end of the saddle is provided with arms terminating in lug receiving openings 1$^d$, and cross bearings 1$^e$, to removably receive and contain the hinge lugs of the hopper carrying open base or frame to be now described.

As a means of enabling the hopper or can to be readily attached to or detached from the saddle 1, and the feed driving mechanism hereinafter described, and particularly as a means of readily inserting or removing any desired set of feed and distributing plates within the bottom portion of the hopper when the latter is detached and reversed or up-ended and without disturbing or taking out the seed contents of the hopper, the latter is provided at its base with a hopper carrying open base or frame 4, in the present instance, in the specific form of a ring provided at its rear end with hinge lugs 4$^a$, adapted to enter into the openings 1$^d$, and engage the cross members 1$^e$, of the arms of the saddle, and being provided at its front with a connecting lug 4$^b$, adapted to register with and to be connected to the lug member 1$^b$, by means of a connecting bolt 2. The upper portion of the ring frame or base 4, is provided with an offset marginal portion or flange 4$^c$ (see Fig. 4), adapted to support the lower marginal edges of the can 3, and having an annulus to enter the can 3, said open base or ring 4, being adapted to be detachably connected to the can in any suitable and convenient manner, as for example,—by means of connecting bolts 4$^d$, extending downwardly along the lower portions of the can and through lugs 4$^e$, of the hopper carrying base ring.

The seed discharging mechanism, whether specifically designed for corn, or for cotton seed, as hereinafter described, comprises a seed distributing plate arranged beneath the hopper carrying base or frame, a seed plate arranged within and below the distributing plate, and a subjacent plate retainer removably and hingedly connected to the hopper carrying base frame and provided with a discharge opening adapted to receive the kernels as discharged from the knock-out mechanism carried by the distributer plate.

Referring to the specific details of the seed distributor and feed and retainer plates adapted for the dispensing or discharging of corn as shown in Figs. 4, 5, and 6 of the drawings, it will be seen that the corn seed distributor plate 5, comprises a rim portion having an annular flange 5$^a$, adapted to fit within the lower marginal edges of the hopper carrying ring or base 4, and affording a shoulder to abut against the latter. As a means of interlocking the corn distributor plate 5, in engagement with the lower portion of the hopper carrying ring or base 4, to prevent relative circumferential movement when the plates are in position and as against the rotation of the feed plate hereinafter referred to, the edge of the corn distribution plate 5, is provided at one edge (see Fig. 22), with an upwardly extending lug $5^b$, adapted to be seated within a similarly shaped notch in the lower edge of the hopper carrying ring 4.

As a means of directing the corn into and over the annular space or pathway traversed by the seed cells in the corn plate, the distributer plate 5, is provided with a central disc portion $5^c$, of concavo-convex shape in cross section, the edges of said central raised portion $5^c$, being connected to the ring portion 5, of the plate by means of curved bridge members $5^d$. The lower side of the distributor plate 5, is provided with a depending annular flange $5^e$, corresponding in depth or thickness substantially to the thickness of the corn feed plate 6, so that when the latter is inserted and held in by means of the retainer plate hereinafter referred to, such rotary feed plate 6, will be held central. The corn feed plate 6, is provided with suitably spaced seed cells $6^a$, (in the present instance in sets of two) and the feed plate 6, is provided about its inner periphery with inwardly extending lugs $6^b$, adapted to be engaged by the arms $7^a$, of the driving head 7, arranged above the saddle 1, (see Fig. 3) and carried upon the end of the angular shaped driving shaft 8. It will be obvious that the connection between the driving lugs $6^b$, of the feed plate and the arm $7^a$, of the driving head 7, is such that the hopper carrying open base and the hopper may be readily detached at any time, thereby effecting a disconnection between the driving lugs mentioned.

As a means of providing suitable cut-off and knock-out mechanism immediately above the pathway traversed by the seed cells and in cooperation with the seed distributor plate, the latter is provided with a relatively fixed bridging housing $5^f$, within which is pivotally mounted cut-off and knock-out members 9 and 10, respectively, said members 9 and 10 being pivotally mounted in the housing $5^f$, by means of bearing lugs or trunnions $9^a$, and $10^a$, respectively, and being held therein by means of retaining members $11^a$, of a removable cover 11, held in place by means of an attaching bolt $11^b$, and nut $11^c$. The cut-off has a relatively wide blade or nose adapted to pass over the seed cells $6^a$, the latter being preferably provided with undercut or bevelled edges so that any kernels of corn therein will have a tendency to be retained therein, as the plate is rotated.

In the present instance, the cut-off and knock-out members 9 and 10, are normally held downwardly and are spring resisted by means of a coiled spring $11^d$, interposed between the upwardly extending arm portions of such cut-off and knock-out members.

The nose of the knocker 10, normally rides upon the annular cell containing portion of the feed plate 6, and when brought into registry with one of the cell openings, drops into the latter, thereby knocking out the kernel contained therein, in a well known and understood manner.

As a means of removably retaining the distributor and feed plates 5 and 6 within the open hopper carrying base or ring, the latter is provided at one side with a hinge lug or projection $4^f$, to removably receive and carry a hinge loop $12^a$, of a retainer plate 12. In the present instance, the retainer plate 12 is in the specific form of a ring, said ring being preferably provided with stop lugs $12^b$, to engage with the depending flange $5^e$, of the distributor plate 5, and permit the superposed corn feed plate 6, to be rotated therein. The hingedly connected retainer plate 12, is preferably provided at its free edge with a projection or nose $12^c$, adapted to be secured to the plate 5, in any suitable and convenient manner, as for example,—by means of a latch bolt 13, having a finger head $13^a$, (see Fig. 1) said latch bolt $13^a$, in the present instance, being provided at its upper end with a threaded portion, threaded into a threaded lug $4^g$, on the hopper carrying base or ring.

The retainer plate 12, forms a loose bearing for the superposed feed plate and a closure or bottom for the seed cells therein and is further provided with a seed discharge opening, $12^d$, arranged directly below the knock-out 10, of the seed distributor plate.

Referring now to the improved cotton seed discharging mechanism consisting of the cotton seed distributor plate 14, the cotton seed feed plate 15, and the plate retainer 16, it will be seen that the distributor plate 14, differs from the corn distributing plate 5, in that it is without the central portion $5^c$, so that the cotton seed agitator mechanism hereinafter referred to, may extend upwardly therethru as illustrated most clearly in Figs. 8 and 9 of the drawings.

In view of the fact that the distributor plate 14, when cotton seed is to be sown is to take the place of the corn distributor plate 5, below the open base 4, it is provided at its top with a flange $14^a$, to enter into the lower marginal edges of the ring 4 and with an upwardly extending lug $14^b$, to enter into the notch of the base 4, similar to the lug $5^b$, of the plate 5, to prevent rotation when the seed plate or disc is rotated.

The plate retainer 16, is likewise similar in form to the retainer plate 12, being provided with a hinge loop $16^a$, to engage the hinge lug $4^f$, of the base 4, and with stop lugs $16^b$, and a projection or nose $16^d$, corresponding in form and function to the parts $12^b$ and 12$^c$, of the plate 12. This retainer plate 16 is provided with a seed discharge opening 16$^d$, through which the cotton seed is discharged from the knock-out mechanism above, as hereinafter described.

The feed plate 15, comprises a marginal edge portion adapted to extend within the inner periphery of the distributor plate 14, and an annular raised portion 15$^a$, affording an annular offset ledge or shoulder 15$^b$, said raised annular portion 15$^a$, terminating in a raised ring portion 15$^c$. The inner portion of the ring 15$^c$, is provided with driving lugs 15$^d$, adapted to be engaged by the arms 7$^a$, of the driving head 7, similar to the lug 6$^b$, of the corn feed plate hereinbefore referred to.

In order to insure the feed of the cotton seed to the distributor and feed plates 14 and 15, the outer periphery of the raised ring 15$^c$, is provided with wings 15$^e$, inclined rearwardly from the direction of travel of the feed plate and a second feed or agitator plate 17 is mounted above the raised ring portion 15$^c$, said disc or plate 17, being surmounted with a pair of upwardly and outwardly extending stirring prongs 17$^a$, the later serving not only to assist in carrying the mass of cotton seed around, but to feed it outwardly and downwardly keeping the mass thoroughly stirred up and loosened and as a further means of stirring the cotton seed outwardly, and downwardly to the cotton seed cells of the feed plate,—the stirring plate 17 is provided with an annular series of rearwardly extending fingers 17$^b$.

The central agitator plate 17, is secured to the feed plate 15, in any suitable and convenient manner, as for example,—by means of a connecting bolt 18, extending, in the present instance, downwardly through one of the lugs 15$^d$, so that as the feed plate 15, is rotated, the superposed stirring plate 17, and agitator prongs 17$^a$, will be correspondingly rotated.

The function of the annular raised circular portion 15$^a$, of the feed disc is to provide a plurality of seed cells 15$^f$, inclined to the radii of the circular portion 15$^a$, and tapered forwardly in the direction of rotation of the feed plate and downwardly through the feed plate 15 as shown in Figs. 10, 12 and 21, and being particularly designed and adapted to receive and retain a single kernel of cotton seed and being particularly adapted to co-operate with the inwardly and upwardly inclined seed engaging and distributing prongs or baffle members of the distributor plate 14, as hereinafter referred to. It will be seen that the base portions of the seed cells extend into the outer periphery of the raised portion 15$^a$, and that hook shaped projections 15$^g$, are formed at the rear of the seed cells, thereby adapting the feed plate to more effectively engage the kernels and insuring each cell being filled with a kernel to be discharged by the knocker mechanism hereinafter referred to.

As a means of inclining the bottom portions of the seed cells downwardly and outwardly, the bottom forming plate retainer 16, is provided with an outwardly inclined bevelled annular portion 16$^e$, adapted to fit into a similarly inclined annular recess 15$^h$, immediately beneath the cotton seed cells 15$^f$, of the feed plate 15.

The distributor plate 14, is provided with a plurality or series of inwardly and upwardly inclined cotton seed engaging and distributing lugs or baffle plates 14$^c$, the base portions of which extend in close proximity to the hook shaped projections 15$^g$, of the seed cells 15$^f$, and which overhang such cells for the purpose of causing a kernel of cotton to be positively forced into and retained in each cell.

It will be seen that each baffle plate is provided with an inwardly and forwardly inclined inner edge 14$^d$, inclined forwardly or in the direction of rotation of the subjacent feed plate 15.

The distributer plate 14 is also provided at one side with a cut-off and knock-out housing 14$^e$, overhanging the pathway traversed by the seed cells 15$^f$, of the feed plate and provided with an undercut channel 14$^f$, within which are mounted cut-off and knock-out members 19 and 20 respectively, said cut-off and knock-out members being provided with bearing lugs or trunnions 19$^a$ and 20$^a$, respectively, resting in transversely extending bearing grooves or recesses in the top edges of the housing 14$^e$, the cut-off and knock-out members 19 and 20, being spring resisted and held downwardly in contact with the cell forming edges of the feed plate by means of springs 21, the latter being disposed beneath a cover plate 22, the inner side of said cover plate and the outer wall forming lug portion 22$^a$, fitting down over the bearing trunnions 19$^a$ and 20$^a$, of the members 19 and 20 to retain the latter in operative position. The forward inner portion of the housing 14$^e$, immediately above the pathway traversed by the seed cells is provided with a semi-circular shaped inlet opening 14$^g$, normally closed by the blade portion 19$^b$, of the cut-off member, and it will also be observed that the inner wall forming the exit opening 14$^g$, and the blade 19$^b$, normally closing the same, extend forwardly and inwardly at an inclined or tangential relation to the cell forming annular portion of the feed plate, this arrangement being of particular importance and advantage in co-operating with the tapered and downwardly inclined seed cells 15$^f$, and the forwardly and outwardly extending hook shaped projections 15ᵍ, between such cells. The knock-out member 20 is arranged so as to overlie the seed discharging opening 16ᵈ, in the plate retainer 16, the nose of this knocker being inclined so as to readily override the edges of the seed cells after each seed ejecting operation.

As a means of driving the improved seed discharge mechanism, as applied to a planter of this type, the usual axle driving shaft 20, is provided with a driving gear 21ᵃ, having a plurality of concentrically arranged gear faces 21ᵇ, meshing with a bevel gear 22, slidably mounted on the angular shaped driving shaft 8, which shaft 8 extends upwardly in the saddle 1, and is provided with the driving head 7, driving arms 7ᵃ, hereinbefore referred to.

As a means of throwing the driving gear 21ᵃ, into and out of engagement with the gear 22ᶜ, simultaneously with the downward and upward movements of the furrow openers through the furrow opener actuating and adjusting mechanism of the planter (not shown because forming no part of the present invention), a lever actuated rock shaft 23, (see Figs. 1 and 7) is provided with an arm 24 connected to a connecting link 25, the latter being connected to a lever or arm 26, the arm 26 being formed as a part of an oscillatory sleeve 26ᵃ, the latter being provided with a lateral cam face 26ᵇ, adapted to engage with a similarly shaped and inclined cam face 27ᵃ, on one of the supporting sleeves 27, of the stationary frame. The gear 21, is adapted to be moved longitudinally of the axle shaft 20, against the resistance of a spring 28, surrounding the shaft 20, (see Fig. 2) it being obvious that when the rock shaft 23 is operated, the crank arm 24, will oscillate the sleeve 26ᵃ, and the action of the cam face 26ᵇ, against the adjacent cam face 27ᵃ, will cause such sleeve 26ᵃ, to press the gear 21, against the resistance of the spring 28, and thereby disconnect such gear 21, from the gear 22 above, which latter actuates the feeding mechanism.

As a means of varying the speed of the gear 22, slidably mounted on the angular shaped driving shaft 8, the gear 22 is provided with an extension or hub member 22ᵃ, provided with an annular groove 22ᵇ, and as a means of moving and securing the bevel gear 22 in any desired annular row of teeth 21ᵃ, constituting the face of the driving gear 21, whereby to regulate the speed imparted to the feed plate in the feed hopper, a handle 29 is pivotally mounted on a longitudinally movable bearing bolt 30, the latter being slidably mounted in a depending bracket 31, extending downwardly from the stationary saddle 1, said securing and adjusting handle 29, being provided with a pair of arms 29ᵃ, straddling the sleeve 22ᵃ, and engaging within the annular groove 22ᵇ, by means of rollers 29ᵇ.

The bracket 31, which sustains the adjusting handle 29, is provided with a series of openings 31ᵃ, and the handle is provided with a pin or lug 29ᶜ, adapted when adjusted to fit into one of the openings 31ᵃ, and thereby hold the same in adjusted position. When it is desired to shift the gear 22, the handle 29 is pulled outwardly away from the bracket thereby sliding the bearing bolt 30, laterally in the bracket against the resistance of the spring 32, and when the desired adjustment and hole is reached, the handle is returned with one of the projections 29ᵃ, in one of the openings 31ᵃ, the spring 32 assisting in returning the handle to such a position.

While I have described my invention in connection with the planting of corn and cotton seed, it should be understood that the same is equally adapted to the planting of kaffir, corn maize, peanuts, etc., and that if desired a large variety of seeds may be planted by the use of special seed plates having seed cells adapted to the particular seeds to be planted, and mounted in a quick detachable hopper carrying open base and plate retainer substantially as above described.

From the foregoing description, taken in connection with the accompanying drawings, the operation and advantages of my invention will be readily understood.

Having thus described some of the embodiments of my invention, without having attempted to set forth all the forms in which it may be made, or all the modes of its use, what I claim and desire to secure by Letters Patent, is,—

1. In a seed planter, a ring base, a hopper on the base, a plate retainer ring hingedly connected to the bottom of the base, a feed disc resting on the retainer ring and having an outer annular portion with its outer periphery fitting snugly within the inner periphery of the ring base and provided with a plurality of downwardly inclined seed cells and a raised central portion said seed disc being rotatable over the retainer ring and a distributor above the seed disc.

2. In a seed dispensing mechanism, a hopper carrying open base, a retaining ring detachably secured to the bottom of the base and with its outer periphery snugly fitting within the inner periphery of the base, a seed distributor above said retaining ring and a feed plate removably carried between the distributor and base and a vertical driving shaft within said base detachably connected to said seed distributor.

3. In a seed dispensing mechanism, a saddle frame, a hopper carrying open base frame, hingedly connected to the saddle frame, a retainer ring hingedly secured to the bottom of said hopper carrying open base frame, a seed distributor and feed plates removably carried between said open base frame and said retainer ring, and a vertical driving element arranged beneath said hopper carrying base frame and detachably connected to said feed plate.

4. In a seed discharging mechanism, a saddle frame, a hopper carrying base hingedly connected to the saddle frame, and an annular retainer plate removably secured to the bottom of said hopper carrying base, a circular seed disc and a circular seed distributor within the hopper carrying base, said retainer plate and seed disc having substantially the same exterior diameters and fitting within the hopper base, said distributor being provided with cut-off and knock-out mechanism.

5. In a cotton seed planter, the combination with a rotary seed disc having a flat portion on its outer periphery provided with seed cells downwardly inclined to openings through the disc and separated by hook shaped projections extending inwardly and forwardly in the direction of rotation, and a seed distributor disc above said seed disc provided with a cut-off blade overlying said cells.

6. In a seed discharging mechanism, a hopper carrying base provided with a hinge lug, a seed distributor plate arranged within said ring and provided with cut-off and knock-out mechanism, a rotatably mounted feed plate beneath said seed distributor plate and provided with downwardly inclined seed cells adapted to pass beneath said cut-off and knock-out mechanism, and a plate retainer provided with a hinge loop detachably connected to said hinge lug on the hopper carrying base.

7. In a cotton seed discharging mechanism, the combination with a distributor plate provided on its inner portion with a series of inwardly and upwardly inclined seed engaging and distributing baffle members and having cut-off and knock-out mechanism of a cotton seed feed plate rotatably mounted therein and provided with seed cells inclined in the direction of rotation of said plate and also downwardly inclined to openings in the feed plate and adapted to cooperate with said baffle projections.

8. In a cotton seed planter, a feed disc provided with peripheral seed cells and hook shaped projections inclined in the direction of rotation, and a seed distributor ring surrounding said cells and hook shaped projections, said ring being provided with a cut-off and knock-out housing superposed above said cells and projections and provided with a seed inlet opening closed on its inner side with a cut-off blade extending in a plane tangentially arranged to said cells and projections.

9. In a seed discharging mechanism, a saddle frame, an annular hopper carrying frame hingedly connected thereto, an annular feed plate retaining member removably secured beneath said hopper carrying frame and provided with a seed discharging opening, a seed distributing plate secured between said retaining plate and said hopper carrying frame and provided with cut-off and knock-out mechanism above said discharging opening and a feed plate provided with seed cells downwardly inclined to openings in the feed plate and arranged within said annular hopper carrying frame.

10. In seed dispensing mechanism for planters, a hopper support, a hopper, a hopper carrying ring detachably and hingedly connected to said support, a retainer plate detachably secured to said hopper carrying ring independently of said hopper support, seed distributor and feed plates carried between said retainer plate and said hopper carrying rings, and means for detaching said hopper carrying ring and reversing the latter and said hopper whereby said plates may be removed without removing the contents of said hopper.

11. In seed dispensing mechanism for planters, a hopper support, a hopper carrying open base detachably connected to said support, a hopper, a retainer plate detachably secured to said open base and removable therefrom independently of said hopper support, seed distributor and feed plates carried between said retainer plate and said hopper carrying open base, and means for detaching said hopper carrying open base and reversing the latter and said hopper whereby said plates may be removed or exchanged without removing the contents of said hopper.

In testimony whereof I have affixed my signature.

RICHARD H. GRIFFITH.